Figure 1:
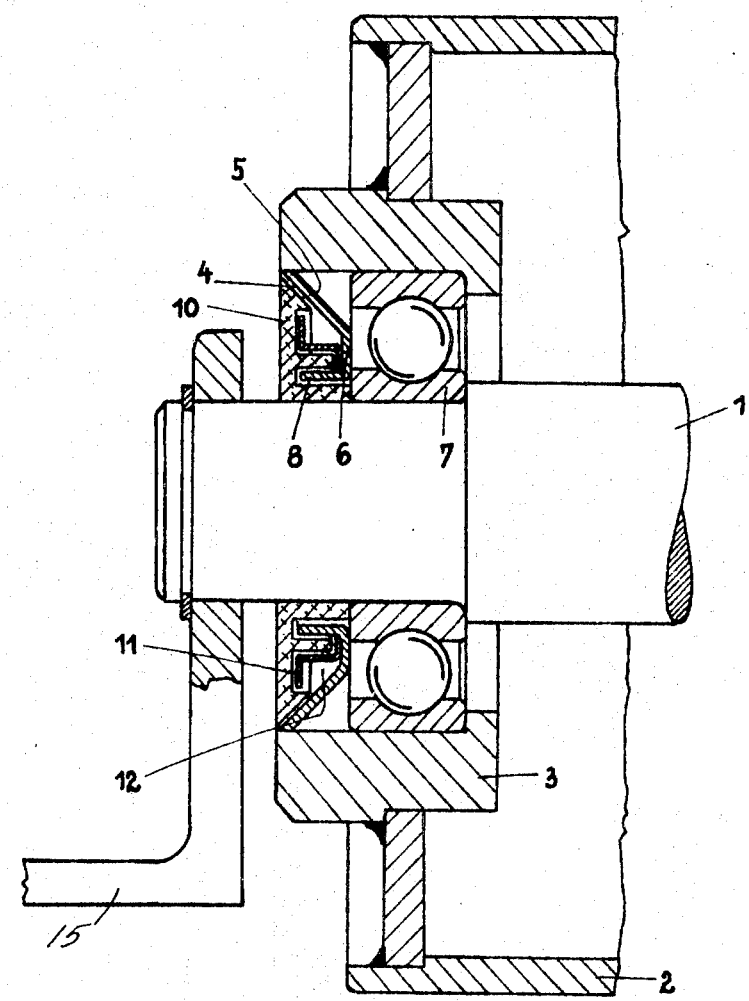

United States Patent [19]
Sernetz et al.

[11] 3,799,634
[45] Mar. 26, 1974

[54] BEARING ARRANGEMENT

[76] Inventors: Heinz Sernetz, Jaingberg 3, A-8200 Gleisdorf; Josef Hirschler, Johann-Sebastian-Bach-Gasse 27, A-8010 Graz, both of Austria

[22] Filed: July 10, 1972

[21] Appl. No.: 270,471

[30] Foreign Application Priority Data
July 16, 1971  Austria................................ 624471

[52] U.S. Cl.................. 308/187.1, 277/25, 277/53, 308/36.4
[51] Int. Cl.............................................. F16c 33/80
[58] Field of Search............ 308/187.1, 187.2, 36.4; 277/25, 53

[56] References Cited
UNITED STATES PATENTS
| | | | |
|---|---|---|---|
| 2,419,885 | 4/1947 | Cooper | 308/187.2 |
| 1,145,516 | 7/1915 | Schmid-Roost | 308/187.1 |
| 2,385,306 | 9/1945 | Shafer | 308/187.2 |

Primary Examiner—Charles J. Myhre
Assistant Examiner—Barry Grossman
Attorney, Agent, or Firm—Kurt Kelman

[57] ABSTRACT

An antifriction bearing in an annular gap between respective coaxial faces of a rotating body and a stationary body is sealed in an axial direction against loss of lubricant and contamination by foreign matter by means of a seal mainly constitutued by two sealing rings. The first ring, fastened to the rotating body has a frustoconical face portion obliquely directed toward the axis, a second substantially cylindrical face portion axially coextensive with the first face portion and of smaller diameter than the smaller base of the first face portion. It is directed radially outward and is connected with the smaller base of the first face portion by a third, substantially radial face portion. The second sealing ring has a frustoconical face closely adjacent the first face portion and bounds therewith a narrow passage extending obliquely from an inner orifice near the afore-mentioned smaller base to an outer orifice adjacent the larger base of the first face portion. The two sealing rings are fastened to the two bodies so that they rotate relative to each other during operation of the bearing.

8 Claims, 4 Drawing Figures

BEARING ARRANGEMENT

This invention relates to anti-friction bearings, and particularly to a bearing arrangement in which an anti-friction bearing is protected against loss of lubricant and contamination with foreign matter by a labyrinth seal.

Known labyrinth seals include radial discs which are fastened respectively to a shaft and to the inner surface of a body mounted on the shaft for relative angular displacement and define axially alternating annular gaps with the shaft and the inner surface. Foreign matter entering such a labyrinth seal may be trapped by centrifugal forces in one of the gaps, and the gradual accumulation of such foreign matter may eventually make the seal inoperative in that later entering foreign matter may displace previously entered foreign particles toward the bearing. Only relatively complex known labyrinth seals can avoid this problem.

It is a primary object of this invention to provide a simple labyrinth seal which is self-cleaning in that it automatically discharges foreign matter by centrifugal forces generated when the two bodies connected by the anti-friction bearing rotate relative to each other.

With this object and others in view, as will presently become apparent, the invention provides a bearing arrangement in which respective inner and outer surfaces of two bodies annular about a common axis radially bound an annular gap. An antifriction bearing or group of bearing elements in the gap connects the two bodies for relative rotation about the axis. The bearing is protected by two sealing rings. A first sealing ring has three annular face portions. The first face portion is frustoconical about the bearing axis and obliquely directed toward the axis. The second face portion is at least approximately cylindrical about the bearing axis, axially coextensive with the first face portion, and of smaller diameter than the smaller base of the frustoconical face portion. The third face portion is essentially radial relative to the bearing axis and connects the second face portion with the smaller base of the first face portion. The second sealing ring has a frustoconical face closely adjacent the afore-mentioned first face portion and bounds therewith a narrow passage extending obliquely away from an inner orifice adjacent the axis toward an outer orifice remote from the axis. The two sealing rings are secured, respectively, to the two bodies for joint rotation with the bodies.

Figure 2:
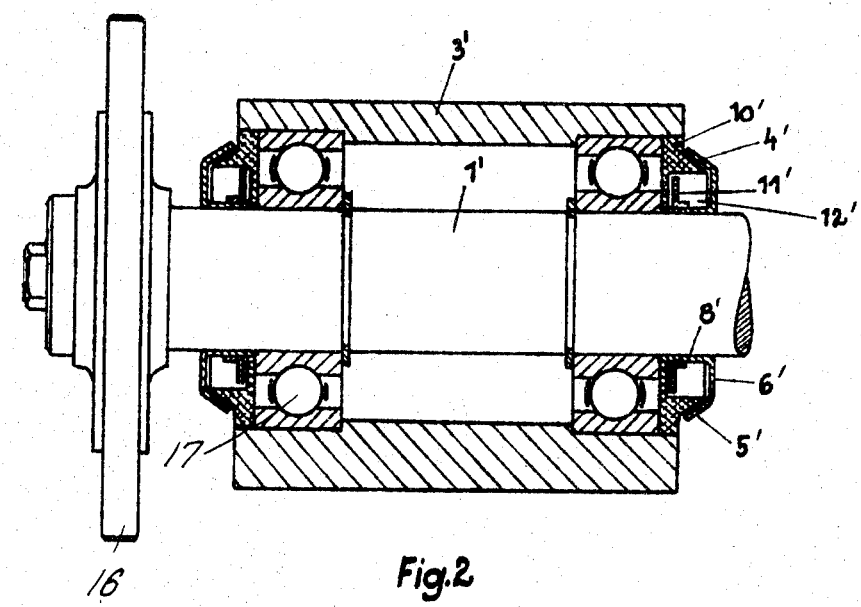
Figure 4:
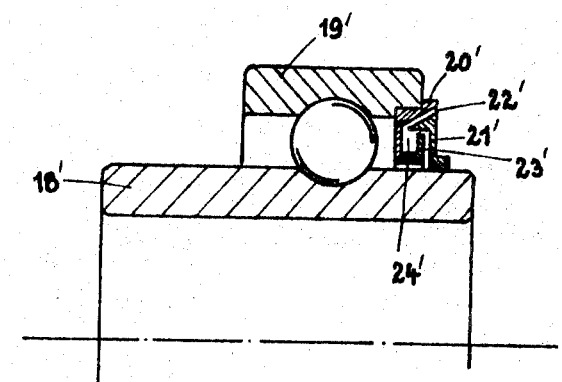

Other features, additional objects, and many of the attendant advantages of this invention will readily be appreciated as the same becomes better understood by reference to the following detailed description of preferred embodiments when considered in connection with the appended drawing in which:

FIG. 1 shows a first bearing arrangement of the invention in section on the bearing axis; and FIGS. 2 and 4 illustrate modification of the bearing arrangement of FIG. 1 in corresponding views.

Referring now to the drawing in detail, and initially to FIG. 1, there is seen a shaft 1 held stationary by a bracket 15. A pulley 2 is coaxially mounted on the shaft by means of a ball bearing 7 in an annular gap between an inner face of a hub portion 3 of the pulley 2 and an outer face of the shaft 1. The ball bearing 7 connects the two faces to permit rotation of the pulley 2 on the fixed shaft 1. The ball bearing 7 is protected against loss of lubricant and contamination with foreign matter by a labyrinth seal of the invention.

The seal includes a first sealing ring 4 of sheet metal which has three angularly offset portions. The first portion 5 is frustoconical. The second portion 8 is tubular about the bearing axis and axially coextensive with the first portion. Its diameter is smaller than that of the smaller base of the frustoconical portion 5. The third portion 6 is radial and connects the tubular portion 8 with the small base of the frustoconical portion 5. The labyrinth is bounded in part by the face of the frustoconical portion 5 which is directed obliquely toward the bearing axis, the face of the radial portion 6 directed axially away from the bearing 7, and by the face of the cylindrical tubular portion 8 directed radially outward.

A second sealing ring 10 of oil resistant rubber or other elastomeric material is flush with the axially terminal, radial face of the hub 3. It has a frustoconical face closely opposite the corresponding face of the portion 5 of the first sealing ring. The two frustoconical faces bound a narrow passage whose inner circular orifice directly communicates with an annular chamber 12 between the two sealing rings, and whose outer circular orifice is closely adjacent the aforementioned radial face of the hub 3.

The second sealing ring is approximately F-shaped in cross section. The longer one of its two tubular flanges is secured to the shaft 1 either by the resiliency of the second sealing ring alone, or additionally by a suitable adhesive. The tubular portion 8 of the first sealing ring is received between the two tubular flanges of the second sealing ring.

An annular slinger 11 having a cross-sectional S- or Z-shape is arranged mainly in the afore-mentioned chamber 12. As far as received in the chamber 12, the slinger has a tubular part axially coextensive with the tubular portion 8 of the first sealing member and a part extending radially outward from the axial end of the tubular part remote from the radial portion 6 of the first sealing ring. A radial flange of the slinger 11 is received between the shorter tubular flange of the second sealing ring and the radial portion 6 of the first sealing ring and attached to the latter.

The first sealing ring is secured against angular displacement on the hub 3 either by resilient engagement with the inner face of the hub 3 or additionally by means of a layer of adhesive too thin to permit pictorial representation on the scale of FIG. 1. The slinger 11 also consists of sheet metal and is fastened to the first sealing ring 4 by its own resiliency or by adhesive, as described above.

Water and solid particles which may penetrate through the narrow conical passage along the portion 5 of the ring 4 into the chamber 12 while the pulley 2 stands still are discharged from the outer orifice of the passage by centrifugal forces when the pulley rotates, the rotary motion being imparted to the undesired contents of the chamber 12 by the ring 4 and the slinger 11 which jointly bound an annular trough radially aligned with the inner orifice of the aforementioned conical passage. Penetration of contaminants beyond the chamber 12 is prevented by the walls of the trough.

If the bearing arrangement shown in FIG. 1 to have a horizontal axis is turned 90° or less so that the axis of rotation is vertical or obliquely inclined to the horizontal, the frustoconical face of the rotating sealing ring 4 will still cause discharge of contaminants.

In the modified bearing arrangement shown in FIG. 2, the shaft 1' is being rotated by means of a wheel 16, and is journaled by means of ball bearings 17 in a tubular bearing block 3' which is a part of stationary machinery not otherwise shown.

Each ball bearing 17 is protected by one of two identical labyrinth seals similar to that described with reference to FIG. 1. A first sealing ring 4' of sheet material is fixedly fastened to the rotating shaft 1' and has a radially outermost, frustoconical portion 5' connected by a radial portion 6' to a tubular portion 8' directly attached to the shaft 1', the labyrinth-forming face portions of the first sealing ring 4' being directed generally toward an annular chamber 12'.

A second sealing ring 10' of elastomeric material is attached to the bearing block 3', and it has a frustoconical face which, jointly with the face of the ring portion 5' directed obliquely toward the axis of rotation, defines a narrow conical passage whose inner orifice is at the chamber 12', and whose outer orifice is near the bearing block 3'. A slinger 11', L-shaped in cross section, is attached to the tubular portion 8' of the first sealing ring 4' in the chamber 12', to bound therewith a trough radially open toward the inner orifice of the conical passage.

The labyrinth seals shown in FIG. 2 operate in the same manner as described with reference to FIG. 1. Foreign matter can penetrate only as far as the chamber 12' when the shaft 1' stands still. When the shaft is rotated by the wheel 16, foreign matter in the chamber 12' is caused to rotate by the walls of the trough constituted by the slinger 11' and the portions 8', 6' of the first sealing ring, and discharged through the conical passage, further angular acceleration being provided in the passage by the portion 5' of the ring 4'.

Figure 3:
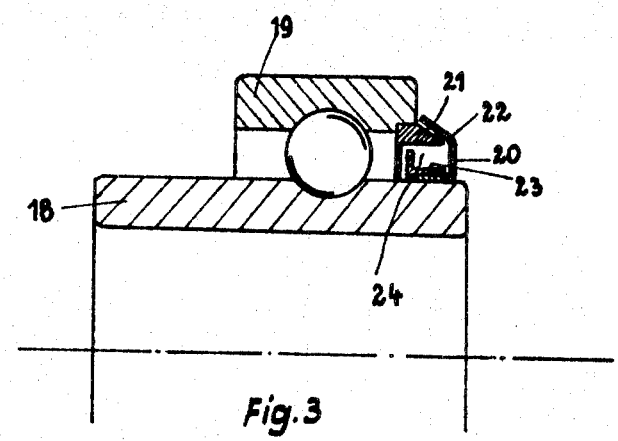

Labyrinth seals analogous to those shown in FIGS. 1 and 2 may directly connect the rings of a ball bearing as is shown in FIGS. 3 and 4.

In the bearing of FIG. 3, the inner bearing ring 18 is rotated about the bearing axis in a non-illustrated manner while the outer bearing ring 19 stands still. The first sealing ring 20, of cast metal, but otherwise closely similar to the afore-described rings 4,4', is mounted on the rotatable inner ring 18. Its frustoconical portion and a mating face of a second sealing ring 21 fixedly fastened to the stationary outer bearing ring 19 bound a narrow conical passage 22 connecting an annular chamber 24 with an outer orifice open to the ambient atmosphere substantially as in FIG. 2. An annular slinger 23 in the chamber 24 bounds a trough open toward the inner orifice of the passage 22 and assists in centrifugally discharging contaminants that may enter the chamber 24 while the illustrated bearing stands still.

In the ball bearing illustrated in FIG. 4, the inner ring 18' stands still while the outer ring 19' rotates in normal operation of the device. The first sealing ring 20', similar to the ring 4 shown in FIG. 1, rotates with the outer bearing ring 19' and cooperates with a second sealing ring 21' fixed on the stationary inner ring 18'. The second sealing ring differs from the sealing ring 11 shown in FIG. 1 by a simpler configuration. It has a conical portion which defines a passage 22' with the conical face of the first sealing ring 20', but otherwise presents a flat radial wall to the annular chamber 24'. An annular slinger 23' in the chamber is attached to the cylindrical portion of the first sealing ring 20' to form a trough and bounds a narrow radial passage with the radial wall of the second sealing ring 21'. The last mentioned radial passage communicates with the interior of the bearing through a narrow axial gap between the cylindrical portion of the first sealing ring 20' and the stationary cylindrical surface of the bearing ring 18' which does not permit the escape of lubricant.

Any contaminant entering the chamber 24' through the narrow conical gap 22' is retained in the inoperative ball bearing within the chamber 24', as described above, and discharged by centrifugal forces through the passage 22' as soon as the bearing ring 19' rotates at adequate speed.

Depending on the intended rotary speed of the body to which the first sealing ring is attached, the apex angle of the frustoconical face portion of the first sealing ring, and the substantially identical apex angle of the spacedly opposite face of the second sealing ring may be chosen different from the angle of approximately 90° illustrated in the drawing. Generally, the best effects of the labyrinth seal of the invention are achieved at apex angles between 30° and 120°, the optimum value being readily determined by previous experience or by a few simple tests.

As shown, it is always the inner surface of frustoconical portion 5 of rotating ring 4 which forms the gap with the frustoconical surface of the stationary ring, i.e., the outer boundary surface of the frustoconical position of the sealing gap rotates while the inner one is stationary.

As contaminants, such as dust and other solid particles as well as liquids, tend to migrate radially outwardly under the influence of centrifugal forces, these materials are predominantly collected by the illustrated structure on a rotating surface where they remain under the direct influence of the centrifugal forces. Movement of these particles to the outside of the sealing device is thereby enhanced.

While the invention has been described with reference to specific embodiments, it should be understood that it is not limited to the illustrative examples chosen for the purpose of the disclosure, but is to be construed broadly and limited only by the scope and spirit of the appended claims.

What is claimed is:

1. A bearing arrangement comprising:
   a. a first body having an inner annular surface about an axis;
   b. a second body having an outer annular surface about said axis, said surfaces radially bounding an annular gap therebetween;
   c. antifriction bearing means interposed between said faces in said gap and connecting said bodies for relative rotation about said axis;
   d. a first sealing ring axially offset from said bearing, said ring having three annular face portions,
      1. a first one of said face portions being frustoconical about said axis and being obliquely directed toward said axis,
      2. a second face portion being tubular about said axis, axially coextensive with said first face portion, and smaller in diameter than the smaller base of said first face portion, said second face portion being directed radially outward, 3. the third face portion radially connecting said second face portion to said smaller base of said first face portion;

e. a second sealing ring having a frustoconical face closely adjacent said first face portion and bounding therewith a narrow passage extending obliquely away from an inner orifice thereof adjacent said smaller base and said second body toward an outer orifice adjacent said first body, said sealing rings being secured to said bodies respectively for joint relative rotation therewith, 1. said sealing rings jointly bounding an annular chamber radially and axially, said chamber directly communicating with said inner orifice; and f. a slinger member secured to said first sealing ring in said chamber for joint rotation, said slinger member and said first sealing ring defining an annular trough having a side open in a radially outward direction, said inner orifice being radially aligned with said open side.

2. An arrangement as set forth in claim 1, further comprising wall means defining a narrow labyrinth passage leading from said chamber to said antifriction means, respective portions of said labyrinth passage being angularly offset from each other, the wall means of at least one of said angularly offset portions being constituted by said slinger member and said sealing ring.

3. An arrangement as set forth in claim 1, wherein said first body has an end face extending radially relative to said axis, said second sealing ring has an outer face extending substantially in a common plane with said end face, said outer orifice separating said outer face and said end face, the remainder of said second sealing ring, said first sealing ring, and said slinger member being axially offset from said outer face in a direction inward of said gap.

4. An arrangement as set forth in claim 1, wherein said frustoconical face portion has an apex angle of 30° to 120°.

5. An arrangement as set forth in claim 1, further comprising means for keeping one of said bodies stationary and for rotating the other body relative to said one body, said second sealing ring being secured to said first body, and said first sealing ring being secured to said second body.

6. An arrangement as set forth in claim 1, wherein the frustoconical face forming the outer boundary of the narrow passage rotates.

7. A bearing arrangement comprising:

a. a first body having an inner annular surface about an axis;

b. a second body having an outer annular surface about the axis, said surfaces radially bounding an annular gap therebetween;

c. antifriction bearing means interposed between said surfaces in the gap and connecting the bodies for rotation of one of the bodies in respect of a stationary other one of the bodies;

d. a first sealing ring axially offset from, and adjacent, the bearing means, the first sealing ring being affixed to the rotary body for rotation therewith and having three annular face portions, 1. a first one of the face portions being frustoconical about, and obliquely directed toward, the axis and the bearing means, 2. a second one of the face portions being tubular about the axis, and 3. a third one of the face portions extending radially and connecting the first and second face portions; and e. a second sealing ring remote from the bearing means and axially offset from the third face portion of the first sealing ring, the second sealing ring being affixed to the stationary body and having a frustoconical face closely adjacent, and substantially parallel, to the first face portion, the frustoconical face and first face portion defining a narrow passage therebetween extending obliquely away from an inner orifice thereof, and 1. a tubular face about the axis, the tubular face defining an axially extending narrow passage with the tubular face portion of the first sealing ring, and the sealing rings defining therebetween an annular chamber bounded by the tubular face portion of the first sealing ring and at one axial end adjacent the bearing means by the radially extending face portion of the first sealing ring, and the inner orifice of the narrow passage opening into the outer axial end of the annular chamber.

8. An arrangement as set forth in claim 7, further comprising wall means defining a labyrinth passage extending from the narrow passage between the two sealing rings.

* * * * *